(12) United States Patent
Randall et al.

(10) Patent No.: US 11,773,230 B2
(45) Date of Patent: Oct. 3, 2023

(54) REFRESH AGENT

(71) Applicant: Bridgestone Americas Tire Operations, LLC, Nashville, TN (US)

(72) Inventors: Amy M. Randall, Brentwood, TN (US); Maryangel G. Dunlavy, Ravenna, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

(21) Appl. No.: 16/933,528

(22) Filed: Jul. 20, 2020

(65) Prior Publication Data

US 2021/0002442 A1 Jan. 7, 2021

Related U.S. Application Data

(62) Division of application No. 14/765,412, filed as application No. PCT/US2014/025201 on Mar. 13, 2014, now Pat. No. 10,717,838.

(Continued)

(51) Int. Cl.
*C08J 7/06* (2006.01)
*B60C 1/00* (2006.01)
(Continued)

(52) U.S. Cl.
CPC ............. *C08J 7/065* (2013.01); *B32B 25/042* (2013.01); *B32B 25/12* (2013.01); *B32B 25/16* (2013.01);
(Continued)

(58) Field of Classification Search
CPC ..... C08J 7/065; C08J 5/122; C09J 5/02; C09J 5/04; C09J 2407/008; C09J 2409/008;
(Continued)

(56) References Cited

U.S. PATENT DOCUMENTS 2,776,190 A 1/1957 Mantell et al.
3,460,975 A 8/1969 Stebleton
(Continued)

FOREIGN PATENT DOCUMENTS

CH 307987 6/1955
DE 927714 C 5/1955
(Continued)

OTHER PUBLICATIONS

Tanzi et al, Terpenes as Green Solvents for Exraction of Oil from Microalgae, Jul. 9, 2012, Molecules 2012, 17, 8196-8205 (Year: 2012).*

(Continued)

*Primary Examiner* — Jasper Saberi
(74) *Attorney, Agent, or Firm* — Meredith E. Hooker; Nathan T. Lewis (57) ABSTRACT

A coated rubber composition includes a rubber composition coated with a liquid refresh agent selected from the group consisting of one or more liquid terpenes, limonene, carvone, pinene, pine needle oil, citral, orange oil, $C_9$-$C_{15}$ aliphatics, $C_9$-$C_{15}$ cycloaliphatics, ethyl lactate, dipentene, 1,8-cineole, eucalyptol, citronellol, geraniol, citronellene, terpinen-4-ol, and combinations thereof. A method of application and a coated rubber composition are also disclosed.

20 Claims, 2 Drawing Sheets

Related U.S. Application Data (60) Provisional application No. 61/782,223, filed on Mar. 14, 2013.

(51) Int. Cl.
| | | |
|---|---|---|
| *C08L 21/00* | (2006.01) | |
| *C08J 5/12* | (2006.01) | |
| *C08J 7/043* | (2020.01) | |
| *B32B 25/04* | (2006.01) | |
| *B32B 25/12* | (2006.01) | |
| *B32B 25/16* | (2006.01) | |
| *B32B 25/18* | (2006.01) | |
| *C09J 5/02* | (2006.01) | |
| *C08K 5/04* | (2006.01) | |
| *C08K 5/01* | (2006.01) | |
| *C08C 4/00* | (2006.01) | |
| *B60C 27/02* | (2006.01) | |
| *C09J 193/04* | (2006.01) | |
| *C09J 193/00* | (2006.01) | |

(52) U.S. Cl.
CPC ............... *B32B 25/18* (2013.01); *B60C 1/00* (2013.01); *C08J 5/122* (2013.01); *C08J 7/043* (2020.01); *C08L 21/00* (2013.01); *C09J 5/02* (2013.01); *B32B 2255/10* (2013.01); *B32B 2255/24* (2013.01); *B60C 27/0284* (2013.01); *C08C 4/00* (2013.01); *C08J 2307/00* (2013.01); *C08J 2309/00* (2013.01); *C08J 2309/06* (2013.01); *C08J 2321/00* (2013.01); *C08K 5/01* (2013.01); *C08K 5/04* (2013.01); *C08K 2201/007* (2013.01); *C09J 193/00* (2013.01); *C09J 193/04* (2013.01); *C09J 2407/008* (2013.01); *C09J 2409/008* (2013.01); *Y10T 428/24752* (2015.01); *Y10T 428/31826* (2015.04); *Y10T 428/31844* (2015.04); *Y10T 428/31931* (2015.04)

(58) Field of Classification Search
CPC ..... C09J 193/04; C09J 193/00; B32B 25/042; B32B 2255/10
See application file for complete search history.

(56) References Cited

U.S. PATENT DOCUMENTS

| | | |
|---|---|---|
| 3,872,043 A | 3/1975 | Distugil |
| 3,963,850 A | 6/1976 | Doss et al. |
| 4,179,415 A | 12/1979 | Bemmels |
| 4,411,954 A | 10/1983 | Butch, III et al. |
| 4,542,191 A | 9/1985 | Kay et al. |
| 4,601,892 A | 7/1986 | Hart et al. |
| 4,704,225 A | 11/1987 | Stouter |
| 4,737,577 A | 4/1988 | Brown |
| 4,824,501 A | 4/1989 | Ushikubo et al. |
| 4,973,485 A | 11/1990 | Rich |
| 5,281,298 A | 1/1994 | Poisson et al. |
| 5,330,832 A | 7/1994 | Liu |
| 5,362,714 A | 11/1994 | Radford et al. |
| 5,387,524 A | 2/1995 | Hayashibe et al. |
| 5,395,879 A | 3/1995 | Murray |
| 5,441,996 A | 8/1995 | Cummings et al. |
| 5,536,778 A | 7/1996 | Kreckel et al. |
| 5,565,511 A | 10/1996 | Braud et al. |
| 5,652,298 A | 7/1997 | Murray |
| 5,691,408 A | 11/1997 | Murray |
| 5,728,759 A | 3/1998 | Pike |
| 5,783,551 A | 7/1998 | Mirsky |
| 5,807,917 A | 9/1998 | Sulc et al. |
| 5,807,918 A | 9/1998 | Carter |
| 5,938,869 A | 8/1999 | Kaido et al. |
| 5,951,797 A | 9/1999 | Majumdar et al. |
| 5,962,564 A | 10/1999 | Braud et al. |
| 6,127,476 A | 10/2000 | Jialanella et al. |
| 6,136,123 A | 10/2000 | Kaido et al. |
| 6,184,294 B1 | 2/2001 | Park et al. |
| 6,204,321 B1 | 3/2001 | Lanoye |
| 6,387,524 B1 | 5/2002 | Finefrock |
| 6,402,867 B1* | 6/2002 | Kaido ............... B60C 5/14 156/123 |
| 6,590,017 B1* | 7/2003 | Hergenrother ......... B60C 15/06 524/210 |
| 6,767,947 B2 | 7/2004 | Musch et al. |
| 7,175,897 B2 | 2/2007 | Baron et al. |
| 7,730,919 B2 | 6/2010 | Kanenari |
| 7,799,750 B2 | 9/2010 | Kaneko |
| 8,143,338 B1* | 3/2012 | Pompei ............... B60C 1/00 524/495 |
| 8,399,544 B2 | 3/2013 | Varnell et al. |
| 10,717,838 B2 | 7/2020 | Randall et al. |
| 2001/0034386 A1 | 10/2001 | Scheibelhoffer et al. |
| 2002/0111418 A1 | 8/2002 | Konno et al. |
| 2003/0027904 A1 | 2/2003 | Cordova |
| 2004/0033254 A1 | 2/2004 | Song et al. |
| 2004/0147663 A1 | 7/2004 | Silvers et al. |
| 2004/0158003 A1 | 8/2004 | Ruckel et al. |
| 2004/0185249 A1 | 9/2004 | Junghans et al. |
| 2004/0241246 A1 | 12/2004 | Lipman |
| 2005/0100754 A1 | 5/2005 | Moncla et al. |
| 2007/0160833 A1 | 7/2007 | Maak et al. |
| 2007/0207313 A1 | 9/2007 | Ruckel et al. |
| 2007/0219286 A1 | 9/2007 | Ishii |
| 2007/0224395 A1 | 9/2007 | Rowitsch et al. |
| 2007/0249759 A1 | 10/2007 | Miller |
| 2008/0282949 A1 | 11/2008 | Jamal |
| 2009/0065121 A1 | 3/2009 | Silvers et al. |
| 2009/0099309 A1 | 4/2009 | Gumbs |
| 2010/0022417 A1 | 1/2010 | Acunto |
| 2010/0086799 A1 | 4/2010 | Asai et al. |
| 2010/0187478 A1 | 7/2010 | Howard |
| 2010/0312454 A1 | 12/2010 | Nada et al. |
| 2011/0098405 A1 | 4/2011 | Weng et al. |
| 2011/0118404 A1 | 5/2011 | Jung et al. |
| 2012/0118465 A1 | 5/2012 | Majumdar et al. |
| 2012/0128994 A1 | 5/2012 | Majumdar et al. |
| 2012/0175562 A1* | 7/2012 | Howard ............... C11D 7/5022 252/364 |
| 2012/0252713 A1 | 10/2012 | Beatty et al. |
| 2012/0312454 A1 | 12/2012 | Seferin et al. |
| 2014/0329102 A1 | 11/2014 | Randall et al. |
| 2015/0368419 A1* | 12/2015 | Randall ............... B32B 25/042 428/189 |
| 2020/0248045 A1 | 8/2020 | Randall et al. |

FOREIGN PATENT DOCUMENTS

| | | | |
|---|---|---|---|
| EP | 0049402 A1 | | 4/1982 |
| EP | 0518194 A1 | | 12/1992 |
| EP | 0761477 A1 | | 3/1997 |
| EP | 0842793 A1 | | 5/1998 |
| FR | 2529564 A1 | | 1/1984 |
| GB | 11175 | | 5/1913 |
| GB | 836250 A | | 6/1960 |
| JP | H10306266 A | | 11/1998 |
| JP | 2000191840 A | * | 7/2000 |
| JP | 2001026756 A | | 1/2001 |
| JP | 2001064616 A | | 3/2001 |
| JP | 2002053702 A | | 2/2002 |
| JP | 2002060711 A | | 2/2002 |
| JP | 2003147125 A | | 5/2003 |
| JP | 2004224916 A | | 8/2004 |
| JP | 2005105218 A | | 4/2005 |
| JP | 2006077038 A | | 3/2006 |
| JP | 2007070464 A | | 3/2007 |
| KR | 1020050044993 A | | 5/2005 |
| WO | 9519385 A1 | | 7/1995 |
| WO | 9735914 | | 10/1997 |
| WO | 03037980 A1 | | 5/2003 |

(56) References Cited

FOREIGN PATENT DOCUMENTS

| | | |
|---|---|---|
| WO | 03089511 A1 | 10/2003 |
| WO | 2010019862 A1 | 2/2010 |
| WO | 2011079365 A1 | 7/2011 |

OTHER PUBLICATIONS

Merriam-Webster Dictionary, "Cement", 2022, https://www.merriam-webster.com/dictionary/cement (Year: 2022).*

"Citral", Nov. 2008, IPCS INCHEM, https://inchem.org/documents/icsc/icsc/eics1725.htm#:~:text=Chemical%20dangers&text=Flash%20point%3A%2082%C2%B0C%20c.c. (Year: 2008).*

Chiche, A. et al., "Cavity growth in soft adhesives," The European Physical Journal E, vol. 17, pp. 389-401 (2005).

Class, Jay B., "Tackifying rubber compositions," Rubber World, pp. 44-50 (Oct. 1998).

Fitch, J.C. et al.,"Pressure-Sensitive Adhesives Based on Neoprene Latex 102," Adhesives Age, pp. 23-26 (Oct. 1977).

Font, R. et al., "Leaching of Toluene-Neoprene Adhesive Wastes," Environmental Science & Technology, vol. 35, No. 5, pp. 977-983 (2001).

Font, R. et al., "Reduction of solvent content in toluene-neoprene adhesives and in acetone-polyurethane adhesives," Journal of Adhesion Science and Technology, vol. 15, No. 14, pp. 1677-1693 (2001).

Hong, Sung Ran, International Search Report with Written Opinion from PCT/US2012/068562, 13 pp. (dated Mar. 27, 2013).

Jovanovic, R. et al., "Emulsion-Based Pressure-Sensitive Adhesives: A Review," Journal of Macromolecular Science, Part C: Polymer Reviews, vol. 44, No. 1, pp. 1-51 (2004).

Matulewicz, C.M. et al., "Neoprene Latex Pressure-sensitive Adhesives," Adhesives Age, pp. 40-43 (Mar. 1981).

Oldack, Richard C. et al., "Compounding Natural Latex in Water-Based PSA's," Product Information from Firestone Synthetic Rubber and Latex Company, pp. 12-1 thru 12-10 (1979).

Snow, Jr. A.M., "Contact Adhesives Based on Carboxylated Neoprene Latex," Adhesives Age, pp. 35-37 (Jul. 1980).

Tirumkudulu, Mahesh et al., "Measuring the 'tack' of waterborne adhesives," Journal of Rheology, vol. 47, No. 6, pp. 1399-1415 (Nov./Dec. 2003).

Varghese, Lity Alen et al., "Performance of neoprene-phenolic adhesives on different substrates," Journal of Adhesion Science and Technology, vol. 20, No. 14, pp. 1625-1635 (2006).

Yang, Henry W.H. et al., "The Role of Viscoelastic Properties in the Design of Pressure-sensitive Adhesives," Reviews, vol. 5, No. 11, pp. 380-384 (Nov. 1997).

Belfiore, Laurence A., "Physical Properties of Macromolecules", John Wiley & Sons, Inc., 4 pages.

Chemistry Encyclopedia, "Residue", Retrieved Date: Nov. 6, 2017, Retrieved At: <<http://www.chemistryexplained.com/Pr-Ro/Residue.html>>, 2 pages.

Supplementary European Search Report for European Patent Application No. EP12854734.6, dated Jul. 2, 2015, 4 pages.

White and De, Rubber Technologist's Handbook, p. 148 (Rapra Tech. Ltd. 2001).

Zosel, Albrecht, "Build to Last", Adhesives Age, pp. 34-40 (Aug. 2000).

Chang, Bong Ho, International Search Report with Written Opinion from PCT/US2014/025201, 12 pp. (dated Aug. 5, 2014).

Dejoye, Tanzi, et al., "Terpenes as green solvents for extraction of oil from microalgae", Molecules, vol. 17, pp. 8196-8205 (2012).

Canadian Intellectual Property Office, "Office Action for Canadian Patent Application No. 2,900,699", dated Sep. 2, 2016, 4 pages.

Pamies Ollie, Silvia, "Extended European Search Report for European Patent Application No. 14774552.5", dated Sep. 30, 2016, 9 pages.

European Patent Office, "Office Action for European Patent Application No. 14774552.5", dated Oct. 18, 2016, 2 pages.

Canadian Intellectual Property Office, "Office Action for Canadian Patent Application No. 2,900,699", dated May 1, 2017, 4 pages.

Arizona Chemical, "Sylvares ZT 105LT", Product Data Sheet, Oct. 27, 2016, 11 pages.

Bart, Jan C.J., "Additives in Polymers Industrial Analysis and Applications", John Wiley & Sons, Ltd., 2005, 14 pages.

Pubchem, "Alpha-Pinene", Retrieved Date: Mar. 25, 2019, Retrieved At: <<https://pubchem.ncbi.nlm.nih.gov/compound/alpha-pinene#section=Structures>>, 96 pages.

Pubchem, "Gum Rosin", Retrieved Date: Mar. 25, 2019, Retrieved At: <<https://pubchem.ncbi.nlm.nih.gov/compound/24206434#section=Top>>, 14 pages.

CDH, "Citronellol CAS No. 106-22-9", Retrieved At: <<https://www.cdhfinechemical.com/images/product/msds/19_1588752699_Citronellol-CASNO-106-22-9-MSDS.pdf>>, 2018, 7 pages.

"D-Limonene", May 30, 2014, California Air Resources Board, https://www.arb.ca.gov/db/solvents/solvent_pages/Hydrocarbon-HTML/d-limonene.htm (Year: 2014).

Lewis, Nathan T., "Response to the Advisory Action for U.S. Appl. No. 14/765,412", filed Nov. 21, 2018, 9 pages.

Lewis, Nathan T., "Response to the Final Office Action for U.S. Appl. No. 14/765,412", filed Oct. 23, 2018, 9 pages.

Lewis, Nathan T., "Response to the Office Action for U.S. Appl. No. 14/765,412", filed Apr. 1, 2019, 10 pages.

Lewis, Nathan T., "Response to the Office Action for U.S. Appl. No. 14/765,412", filed Mar. 23, 2018, 8 pages.

Lewis, Nathan T., "Response to the Office Action for U.S. Appl. No. 14/765,412", filed Nov. 8, 2019, 10 pages.

Lewis, Nathan T., "Response to the Restriction Requirement for U.S. Appl. No. 14/765,412", filed Nov. 21, 2017, 6 pages.

Pubchem, "d-Carvone", Retrieved Date: Jul. 1, 2019, Retrieved At: <<https://pubchem.ncbi.nlm.nih.gov/compound/d-Carvone>>, 70 pages.

Pubchem, "Dodecane", In U.S. National Library of Medicine, National Center for Biotechnology Information, C12H26, Retrieved Date: Jul. 13, 2018, Retrieved At: <<https://pubchem.ncbi.nlm.nih.gov/compound/dodecane#section=Top>>, 75 pages.

Saberi, Jasper, "Advisory Action for U.S. Appl. No. 14/765,412", dated Nov. 8, 2018, 7 pages.

Saberi, Jasper, "Final Office Action for U.S. Appl. No. 14/765,412", dated Jul. 23, 2018, 14 pages.

Saberi, Jasper, "Notice of Allowance for U.S. Appl. No. 14/765,412", dated Mar. 11, 2020, 16 pages.

Saberi, Jasper, "Office Action for U.S. Appl. No. 14/765,412", dated Dec. 27, 2017, 11 pages.

Saberi, Jasper, "Office Action for U.S. Appl. No. 14/765,412", dated Dec. 31, 2018, 14 pages.

Saberi, Jasper, "Office Action for U.S. Appl. No. 14/765,412", dated Jul. 8, 2019, 12 pages.

Saberi, Jasper, "Restriction Requirement for U.S. Appl. No. 14/765,412", dated Sep. 22, 2017, 9 pages.

Oxford English Dictionary, "Residue", Retrieved Date: Dec. 31, 2017, Retrieved At: <<https://en.oxforddictionaries.com/defenition/residue>>, 4 pages.

* cited by examiner

REFRESH AGENT

CROSS-REFERENCE TO RELATED APPLICATIONS

This application is a divisional of U.S. application Ser. No. 14/765,412, which entered the U.S. on Aug. 3, 2015, as a national stage application of PCT/US14/25201 filed on Mar. 13, 2014, which, in turn, claimed the benefit of priority to U.S. Provisional Application No. 61/782,223 filed on Mar. 14, 2013. Each of these prior applications is incorporated herein by reference.

FIELD

This disclosure relates to refresh agents for uncured rubber compositions, particularly for rubber compositions in the tire and air spring industry.

BACKGROUND

Rubber articles made from a plurality of uncured rubber components typically must be held together in some manner during the building and curing process. Some methods of joining uncured rubber components include mechanical methods such as stitching and joining with adhesives. Solvent refresh agents, such as toluene and hexane, may also be used to temporarily increase the tack inherent in the uncured rubber sufficiently to join the rubber components for building and curing. However, conventional refresh agents are typically highly volatile compounds. In addition, adhesives add weight to the rubber article by creating an additional layer of material between the two rubber layers that are being joined. Mechanical methods may not be effective in all building processes that range from highly automated to entirely manual.

Certain alkanes or cycloalkanes, commonly known as light Naphtha, have been used to clean and remove uncured rubber from machinery. This is a much different use than as a refresh agent to temporarily bond uncured rubber.

Example rubber articles that typically incorporate a plurality of uncured rubber components that are joined by some mechanism while curing is performed are rubber air springs and tires.

SUMMARY

In an embodiment, a coated rubber composition comprises a rubber composition coated with a liquid refresh agent selected from the group consisting of one or more liquid terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, and combinations thereof.

In an embodiment, a coated rubber composition comprises a rubber composition coated with a liquid refresh agent selected from the group consisting of one or more liquid terpenes, limonene, carvone, pinene, pine needle oil, citral, orange oil, dipentene, 1,8-cineole, eucalyptol, citronellol, geraniol, citronellene, terpinen-4-ol, $C_9$-$C_{15}$ aliphatics, $C_9$-$C_{15}$ cycloaliphatics, ethyl lactate, and combinations thereof.

In an embodiment, an article of manufacture comprises a first uncured rubber component comprising an elastomer selected from the group consisting of: polychloroprene, butyl rubber, hevea and non-hevea natural rubber, polyisoprene, polybutadiene, nitrile rubber, poly(isoprene-styrene), poly(isoprene-butadiene), poly(styrene-butadiene), terpolymers of isoprene, styrene, and butadiene, and combinations thereof. The first uncured rubber component includes a first coated surface. The surface is coated with an organic liquid having the following characteristics: an evaporation rate of about 0.1 mg/min to about 8 mg/min at 25° C.; and a flash point of about 30° C. to about 100° C.

In an embodiment, a method comprises the following steps: applying a refresh agent to a surface of a first uncured rubber component, the refresh agent being selected from the group consisting of: one or more terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, and combinations thereof, thereby forming a first coated surface; and joining a second uncured rubber component to the first coated surface of the first uncured rubber component at an interface or joining the first coated surface to an overlapping or butt-end portion of the first uncured rubber component at an interface.

In an embodiment, a method comprises the following steps: applying a refresh agent to a surface of a first uncured rubber component, the refresh agent being selected from the group consisting of: one or more terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, $C_9$-$C_{15}$ aliphatics, $C_9$-$C_{15}$ cycloaliphatics, ethyl lactate, and combinations thereof, thereby forming a first coated surface; and joining a second uncured rubber component to the first coated surface of the first uncured rubber component at an interface or joining the first coated surface to an overlapping or butt-end portion of the first uncured rubber component at an interface.

In certain embodiments, all the tack-improving agents or adhesives used on the rubber component may consist essentially of the agents listed above.

DETAILED DESCRIPTION

A refresh agent functions to bring out, improve, or "refresh" the tack present in an uncured rubber compound component. Immediately after forming, an uncured rubber compound component has a warm, unbloomed surface that may be significantly tacky depending on the compound composition. However, after cooling and surface deposition, either from exterior sources such as dust, oils, soap, and dirt, or from components of the rubber composition blooming to the surface such as wax, sulfur, processing aids, or antioxidants, the rubber compound loses tack. A refresh agent is a compound that is applied onto the uncured rubber composition to refresh the tack present in the rubber composition.

A refresh agent differs from an adhesive in that it is a transitory coating that swells the rubber surface, but evaporates or elutes from the rubber compound prior to or during curing. A refresh agent also differs from tackifiers or wetting agents that are mixed into the rubber composition during compounding in that it is a coating directly on the surface of the rubber that evaporates or elutes from the rubber compound prior to or during curing. In an embodiment where the rubber component is a tire component, the joined rubber components may be set on a spinning drum in the manufacturing process and the spinning action aids in the evaporation and eluting of the refresh agent. As the refresh agent is a transitory coating, it results in a reduced weight rubber article compared rubber articles that use adhesives for joining uncured rubber.

In an embodiment, rubber is soluble in the refresh agent, and the refresh agent wets and swells the rubber surface that it is applied to. Without being bound to theory, when the refresh agent is applied to an elastomer substrate, the agent operates to open up the interstices of the polymeric matrix of the elastomeric compound it is applied to. This solubilizing and swelling of the rubber surface facilitates reabsorption of components that may have bloomed to the surface of the rubber during aging. The surface area of the interfaced elastomer substrates may also be increased, contributing to a strong cured bond at the joint interface. While this may be only a temporary effect, it is sufficient for improving tack until the rubber joint interfaces are cured.

In an embodiment, the refresh agent has lower volatility compared to chemicals such as hexane and toluene. Furthermore, the refresh agent has a longer duration of tack-improving effect compared to highly volatile solvents. In addition, a reduced amount of the refresh agent disclosed herein may be used in comparison to highly volatile solvents, thereby further reducing the overall VOC emissions released.

In an embodiment, the refresh agent is a liquid at room temperature and standard pressure and selected from the group consisting of: liquid terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, and combinations thereof. In an embodiment the refresh agent may be selected from the group consisting of: liquid terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, $C_9$-Cis aliphatics, $C_9$-$C_{15}$ cycloaliphatics, ethyl lactate, and combinations thereof.

In an embodiment, the refresh agent has an evaporation rate at 25° C. and ambient pressure (such as 1 atm) of about 0.1 to about 8 mg/min, such as about 1 to about 7 mg/min, or about 1.5 to about 5 mg/min. In an embodiment, the refresh agent has a lower evaporation rate than common highly volatile solvents. In an embodiment, the refresh agent has an evaporation rate at 25° C. and ambient pressure (such as 1 atm) of about 0.01 to about 0.8 mg/min, such as about 0.1 to about 0.7 mg/min, or about 0.15 to about 0.5 mg/min.

In an embodiment, the refresh agent has a flash point of about 30° C. to about 100° C., such as, for example, about 33° C. to about 83° C., or about 40° C. to about 60° C. In an embodiment, the refresh agent has a higher flash point than common highly volatile solvents.

In an embodiment the refresh agent has a molecular weight (formula weight) of about 110 g/mol to about 1000 g/mol, such as, for example about 135 g/mol to about 250 g/mol, or about 150 g/mol to about 200 g/mol. In an embodiment, the refresh agent has a higher molecular weight than common highly volatile solvents, but a lower molecular weight than polymer-based adhesive compositions.

In an embodiment, the refresh agent may have a viscosity at 25° C. of, for example, of about 0.0001 to about 100 cP, such as about 0.1 to about 30 cP, or about 0.25 to about 5 cP.

Those of skill in the art will understand an effective amount of the refresh agent that may be used to provide an effective coating of the refresh agent to join rubber surfaces under the manufacturing conditions with the understanding that the amount is less than conventional highly volatile refresh agent solvents.

In contrast to adhesives, that typically include several components that must be tailored to be compatible with the rubber surfaces to be joined, the refresh agent works with whatever rubber it is applied to in order to refresh the tack inherent in the rubber itself. Thus, the refresh agent does not need to be tailored to be compatible with different elastomers.

Particular examples of rubber articles that the refresh agent may be useful with include those that require multiple components or layers that include rubber-to-rubber joints such as those that are utilized to provide an air barrier, for example, air springs and tire components. In an embodiment, the refresh agent may also be used for constructing multi-component hoses, belts, and vibration isolators.

The rubber composition that the refresh agent is used with includes an elastomer component. In an embodiment, the rubber composition further includes a filler component, a curing agent, and optionally one or more of coupling agents, accelerators, processing aids, metal oxides, fatty acids, antioxidants, and surfactants.

The elastomer component may include elastomeric polymers, such as: polychloroprene, butyl rubber, hevea and non-hevea natural rubber, polyisoprene, polybutadiene, nitrile rubber, poly(isoprene-styrene), poly(isoprene-butadiene), poly(styrene-butadiene), terpolymers of isoprene, styrene, and butadiene, and combinations thereof. In an embodiment, these elastomeric polymers may contain one or more functional groups, including, for example, tin, silicon, and amine containing functional groups. The rubber polymers may be prepared by emulsion, solution, or bulk polymerization according to known suitable methods.

In an embodiment containing a blend of more than one polymer, the ratios (expressed in terms parts per hundred rubber (phr) of such polymer blends can be adjusted according to the desired final viscoelastic properties for the polymerized rubber compound. For example, in an embodiment natural rubber or polyisoprene may comprise about 5 to about 80 phr, such as about 20 phr to about 60 phr, or about 35 phr to about 55 phr; and polybutadiene or styrene-butadiene rubber may comprise about 60 phr to about 5 phr, such as about 50 phr to about 10 phr, or about 15 phr to about 25 phr. In an embodiment, one of the rubbers above is selected and comprises the entire rubber component.

In an embodiment the rubber polymer, may have a number average molecular weight (Mn) of about 100,000 to about 1,000,000, such as about 150,000 to about 600,000, or about 250,000 to about 500,000. In an embodiment, the polydispersity of the rubber polymer (Mw/Mn) may range from about 1.5 to about 6.0, such as about 2.0 to about 5.0, or about 3.0 to about 4.0.

In an embodiment, the reinforcing filler may be selected from the group consisting of carbon black, silica, and mixtures thereof. The total amount of reinforcing filler may be from about 1 to about 100 phr, from about 30 to about 80 phr, from about 40 to about 70 phr, or from about 50 to about 100 phr of filler. Higher amounts of filler may contribute to reduced tack in the uncured rubber composition.

The carbon black can be present in amounts ranging from about 0 to about 80 phr, such as about 5 to about 60 phr, or about 20 to about 50 phr. The carbon black may have a surface area (EMSA) of at least about 20 $m^2$/g, such as, at least about 35 m²/g up to about 200 m²/g or higher. Surface area values used in this application are determined by ASTM D-1765 using the cetyltrimethyl-ammonium bromide (CTAB) technique.

Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks.

A mixture of two or more of the above blacks can be used in preparing the carbon black filled embodiments. The carbon blacks utilized in the preparation of the vulcanizable elastomeric compositions can be in pelletized form or an unpelletized flocculent mass.

A mixture of two or more of the above blacks can be used. Exemplary carbon blacks include, but are not limited to, N-110, N-220, N-339, N-330, N-352, N-550, and N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or in an amount of about 5 to about 80 phr, or in an amount of about 30 to about 70 phr. The useful upper range is limited by the high viscosity imparted by fillers of this type. Some of the commercially available silicas that can be used include, but are not limited to, HiSil® 190, HiSil® 210, HiSil® 215, HiSil® 233, and HiSil® 243, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

The surface area of the silicas may, for example, be about 32 m²/g to about 400 m²/g, such as about 100 m²/g to about 250 m²/g being preferred, or about 150 m²/g to about 220 m²/g. The pH of the silica filler is generally about 5.5 to about 7 or about 6 to about 7.2, or about 5.5 to about 6.8.

If silica is used as a filler, it may be desirable to use a coupling agent to couple the silica to the polymer. Numerous coupling agents are known, including but not limited to organosulfide polysulfides. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl) trisulfide, 3,3'-bis(methylbutylethoxysilylpropyl) tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of organosilane polysulfide compounds can be used.

The amount of coupling agent in the composition is based on the weight of the silica in the composition. The amount of coupling agent present in the composition may be from about 0.1% to about 20% by weight of silica, or from about 1% to about 15% by weight of silica, or from about 2% to about 10% by weight of silica. For example, typical amounts of coupling agents include about 4 to about 10, or about 6 to about 8 phr.

When both carbon black and silica are employed in combination as the reinforcing filler, they may be used in a carbon black-silica ratio of about 10:1 to about 1:4, such as about 5:1 to about 1:3, or about 2:1 to about 1:2.

Certain additional fillers may also be utilized, including mineral fillers, such as clay, talc, aluminum hydrate, aluminum silicate, magnesium silicate, aluminum hydroxide and mica. The foregoing additional fillers are optional and can be utilized in the amount of about 0.5 phr to about 40 phr.

A rubber curing agent is included in the uncured rubber composition. Curing agents include, for example, vulcanization agents. For a general disclosure of suitable vulcanizing agents, one can refer to Kirk-Othmer, Encyclopedia of Chemical Technology, 3rd Ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. In some embodiments, sulfur or peroxide-based vulcanizing agents may be employed. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. In one embodiment, the sulfur vulcanizing agent is soluble sulfur or a mixture of soluble and insoluble polymeric sulfur. Curing agents may bloom to the surface upon aging of the uncured rubber composition. The curing agent may be present in the composition from about 0.001 to about 10 phr, such as from about 0.1 to about 4 phr, or about 0.5 to about 2.5 phr.

In an embodiment, an antidegradant is used to protect the rubber from the oxidation effects of atmospheric ozone.

Antidegradants may also bloom to the surface of the rubber composition upon aging of the uncured rubber. The amount of total antidegradant or staining antidegradant in the composition may be, for example, from about 0.1 to about 15 phr, such as from about 0.3 to about 6 phr, or about 2 phr to about 7 phr.

In an embodiment, the composition comprises a surfactant. Examples of surfactants that may be added include, but are not limited to, polyoxyethylene sorbitan monostearate (e.g., Rheodol® Bs-106) and ether thioether surfactants, such as Vulkanol® 85 and Vulkanol® OT, both being produced by Bayer Corporation. Surfactants may also bloom to the surface of the rubber composition during aging and reduce tack of the uncured rubber surface. The amount of surfactant may range, for example, from 0 to about 10 phr, such as about 0.5 to about 5 phr.

In an embodiment, the rubber composition disclosed herein may also contain additional components, such as those listed below, and in the following amounts:

Processing aids, such as oils or resins: from about 0.001 to about 75 phr, such as from about 5 to about 40 phr, or about 10 to about 25 phr.

Fatty acids, such as stearic acid: from about 0.001 to about 5 phr, such as from about 0.1 to about 3.5 phr, or about 0.5 to about 2 phr.

Metal oxides, such as zinc oxide: from about 0.001 to about 10 phr, such as from about 0.1 to about 5 phr, or about 0.5 to about 3 phr.

Accelerators: from about 0.001 to about 10 phr, such as from about 0.1 to about 6 phr, or about 1.5 to about 4 phr.

In an embodiment, an uncured rubber composition is manufactured by compounding the rubber with various additives and forming it into a desired shape. Over time, the uncured rubber composition ages. As the rubber composition ages, the surface of the composition cools and certain components may bloom to the surface. The aging may last from about 0.5 hours to about 30 days, such as about 3 hours to about 48 hours, or about 24 hours to about 14 days.

The refresh agent may be applied to an uncured rubber composition by, for example, rolling, spraying, brushing, or dropping it onto the surface of a rubber component. The refresh agent wets the surface (as opposed to beading) and coats and swells the rubber composition surface, refreshing the tack.

In an embodiment, after application to a first uncured rubber component, a second uncured rubber component is overlayed on the treated area of the first uncured rubber component and joined to the first coated surface of the uncured rubber component at an interface. In an embodiment, both interfacing surfaces of the first and second uncured rubber components are coated with the refresh agent.

In another embodiment, the first coated surface is joined to an overlapping or butt-end portion of the first uncured rubber component. For example, a planar rubber component such as a tire inner liner may be wrapped around a cylindrical tire building apparatus and joined at an overlapping portion or an end to form a toroidal, partial toroidal, or annular rubber component. In an embodiment, both interfacing overlapping surfaces or both interfacing butt-ends of the first uncured rubber component are coated with the refresh agent.

In an embodiment, the refresh agent may be applied at one or more of the butt-end or overlapping surfaces of a first uncured rubber component in addition to a top or bottom surface of the first uncured rubber composition or an overlayered second uncured rubber component.

The interface need only hold the components together long enough for the rubber components to be cured or partially cured. The duration of the joint may vary based on the amount of refresh agent used. In an embodiment, in comparison to highly volatile refresh agents, the refresh agents disclosed herein allow the joint to endure for a longer time period when applied in an equivalent amount. Alternatively a decreased amount of refresh agent may be used, such as about 25% to about 75% less, such as, for example, about 50% to about 65% less, or about 30% to about 50% less than highly volatile solvents. Therefore, in an embodiment, by using the refresh agents disclosed herein, improved processing conditions may be facilitated, less amount of refresh agent may be used, or both.

The joined uncured rubber components are then cured under conditions necessary for the rubber components to cure, for example, heat, pressure, or in some instances radiation, such as UV light. In an embodiment, the rubber components are vulcanized by methods known in the art. In an embodiment, prior to or during curing, the refresh agent evaporates or elutes from the rubber components. Thus, after curing, it is believed no or essentially no residual of the refresh agent remains in the cured rubber article. This stands in contrast to an adhesive which substantially coats a rubber article and may be present in an amount of 1% or more by weight of the rubber composition. In an embodiment, the cured rubber article is essentially free of the refresh agent. The term "essentially free," as used herein, also includes completely free.

Figure 1:
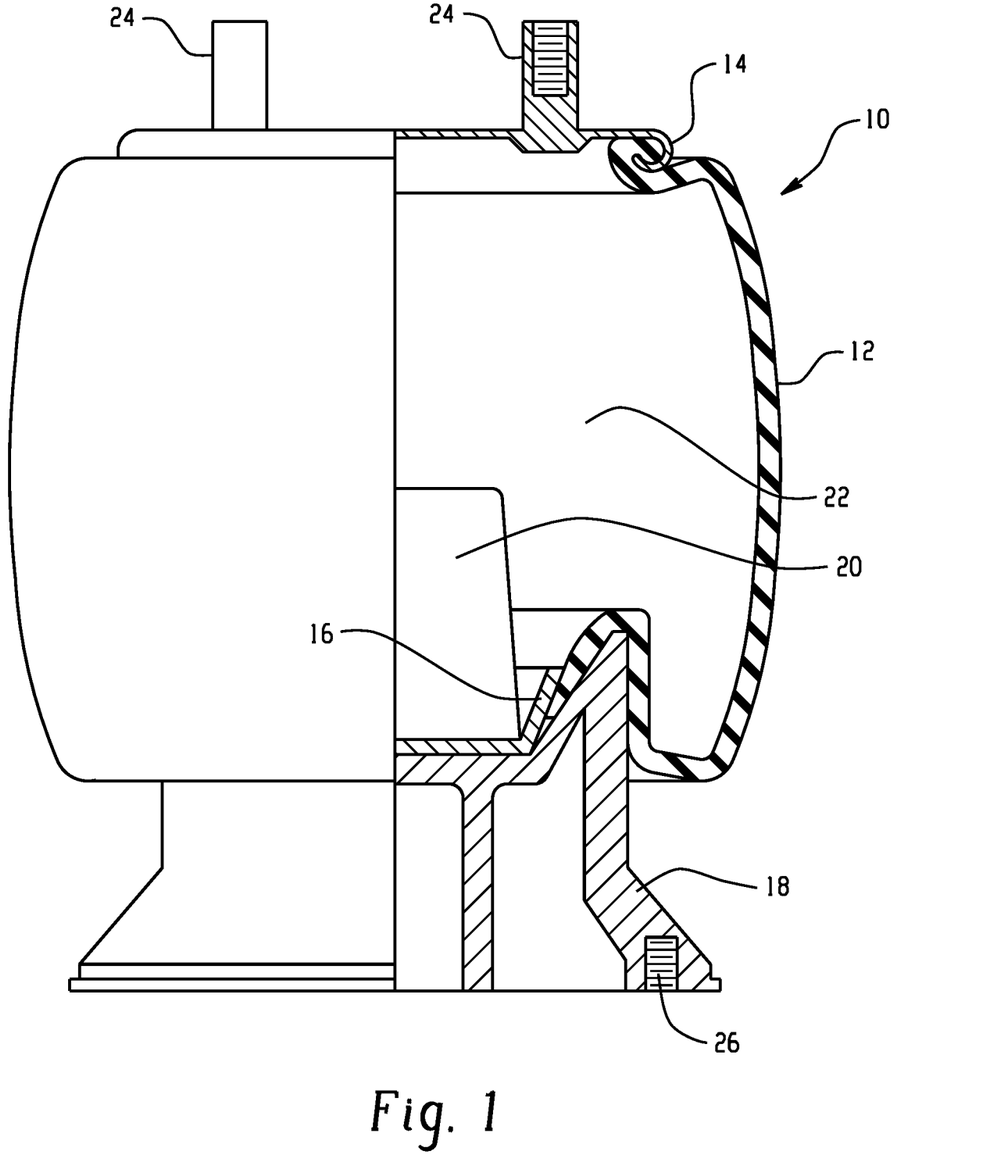
FIG. 1 is a partial cross-sectional view of an embodiment of an air spring.

FIG. 1 shows an embodiment of a reversible sleeve air spring 10. In FIG. 1, the reversible air spring assembly 10 includes flexible airsleeve 12. Bead plate 14 is crimped to airsleeve 12 to form an airtight seal between the bead plate 14 and airsleeve 12. Similarly, end closure 16 is molded to the flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for the flexible airsleeve 12 to roll on during compressive travel. The reversible air spring assembly 10 may optionally include a bumper 20 to support the vehicle when there is no air in the air springs or during extreme road disturbances. Enclosed within airsleeve 12 is a volume of gas 22. Studs 24 and hole 26 are used to secure the reversible air spring assembly 10 to the mounting surface of an automobile (not shown).

In an embodiment, the refresh agent is applied on a surface of a rubber component of an air-spring to securely join the components at an interface for curing. Such rubber components may be layers containing fibers and/or woven-fabric for reinforcement.

Air springs are widely used in large vehicles, such as buses and trucks, because they allow fixedly holding a vehicle's posture against a load change from curb weight to payload weight by controlling the supply of air and the discharge of air to the exterior. In addition, the spring constant can be set to a low level to improve the ride comfort and prevent the damage of freight.

Typical air spring rubber compositions include one or more diene polymers, such as polychloroprene; a reinforcing filler, such as carbon black, in an amount such as 20-100 phr; cure agent; and additives, such as accelerators, wax, plasticizing oil, and antioxidants. An example air spring composition is disclosed in WO 2010/019862, which is incorporated herein by reference.

Figure 2:
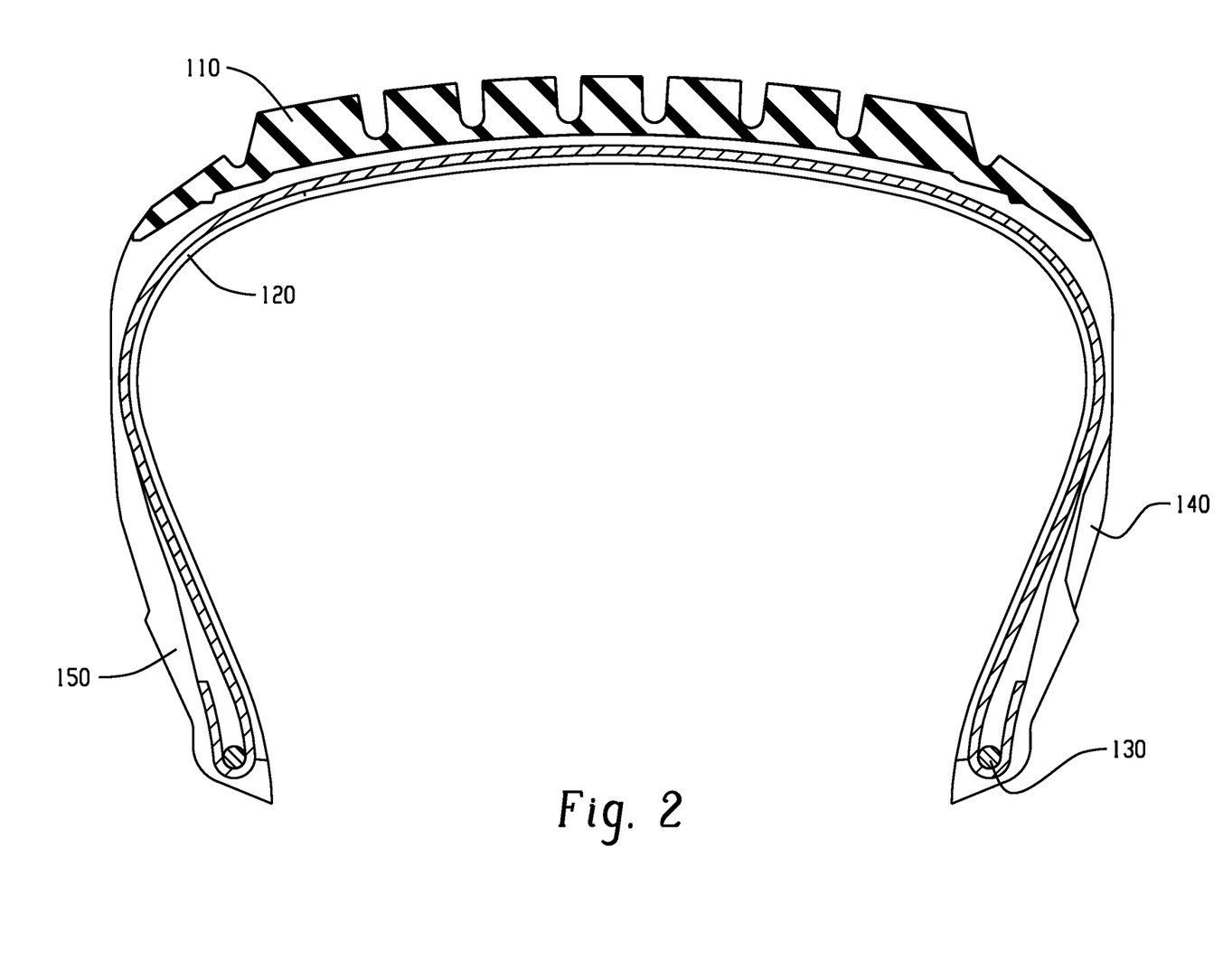
FIG. 2 is a cross-sectional view of a portion of an embodiment of a tire.

FIG. 2 shows a cross-section of a tire. In an example application the refresh agent is applied to various rubber components of the uncured tire. For instance, the refresh agent may be applied to join a spliced tread 110, a spliced inner liner 120, or a spliced bead 130, or to join a sidewall 140 or a carcass layer 150 to the tread 110.

In an embodiment, new tires are constructed by assembling the individual components in an uncured state by joining them together with a refresh agent coated on one or more surfaces, and then, once assembled, the green tire is cured as a whole. An example tire manufacturing method is disclosed in U.S. Pat. No. 4,824,501, which is incorporated herein by reference.

As the Examples below show, the refresh agent described herein is well-suited for use in the manufacture of multi-component rubber articles, such as tires, air springs, hoses, belts, and vibration isolators.

EXAMPLES

Examples 1-7

Seven examples of a low volatility liquid refresh agent were obtained. Certain properties are reported in Table 1.

TABLE 1

| Example | Formula | MW | Evaporation Rate (mg/min) at 25° C. and ambient pressure | Flash point |
|---|---|---|---|---|
| Example 1 Orange Oil | $C_{10}H_{16}$ | 136.23 g/mol | 0.415 | 54° C. (129° F.) - closed cup |
| Example 2 Limonene | $C_{10}H_{16}$ | 136.23 g/mol | 0.192 | 48° C. (118° F.) - closed cup |
| Example 3 Pinene | $C_{10}H_{16}$ | 136.23 g/mol | 0.394 | 33° C. (91° F.) - closed cup |
| Example 4 Pine Needle Oil | 70-97% $C_{10}H_{16}$; 3-30% $C_{12}H_{20}O_2$ | 136.23 g/mol; 196.2 g/mol | 0.310 | 40.56° C. (105.01° F.) - closed cup |
| Example 5 Dodecane | $C_{12}H_{26}$ | 170.33 g/mol | 0.194 | 83° C. (181° F.) - closed cup |
| Example 6 Ethyl Lactate | $CH_3CH(OH)COOCH_2CH_3$ | 118.13 g/mol | 0.373 | 58° C. (136° F.) - closed cup |
| Example 7 C9-C15 $C_9$-$C_{15}$ aliphatics, $C_9$-$C_{15}$ cycloaliphatics | Blend of 60 - 100% $C_9$-$C_{15}$ cycloaliphatics 10 - 40% $C_9$-$C_{15}$ aliphatics | | 0.170 | 66° C. (150° F.) - closed cup |

Examples 8-14 (Controls)

Examples 8-14 were also obtained as controls. These were all volatile organic solvents and several physical properties are disclosed in Table 2.

TABLE 2

| Example | Formula | MW | Evaporation Rate (mg/min) at 25° C. and ambient pressure | Flash point |
|---|---|---|---|---|
| Example 8 Toluene | $C_7H_8$ | 92.14 g/mol | 3.661 | 4.0° C. (39.2° F.) - closed cup |
| Example 9 Hexane | $C_6H_{14}$ | 86.18 g/mol | 6.686 | −26.0° C. (−14.8° F.) - closed cup |
| Example 10 Cyclohexane | $C_6H_{12}$ | 84.16 g/mol | 3.466 | −18.0° C. (−0.4° F.) - closed cup |
| Example 11 Tetrahydrofuran | $C_4H_8O$ | 72.11 g/mol | no data available | −17.0° C. (1.4° F.) - closed cup |
| Example 12 Heptane | $C_7H_{16}$ | 100.20 g/mol | 2.31 | −4.0° C. (24.8° F.) - closed cup |
| Example 13 Benzene | $C_6G_6$ | 78.11 g/mol | no data available | −11.0° C. (12.2° F.) - closed cup |
| Example 14 Xylenes | $C_8H_{10}$ | 106.17 g/mol | 0.967 | 25° C. (77° F.) - closed cup |

Examples 15-20

Examples 15-20 were performed to measure the peel strength of uncured rubber components joined with the refresh agents of Examples 1-5 of Table 1 (Examples 16-20) in comparison to uncured rubber components joined with one of the volatile organic solvents of Table 2, Example 8 (toluene) (Control Example 15). The uncured peel strength measurement primarily shows the tackiness of the joint. This measurement indicates an initial tackiness to hold a joint together temporarily until it can be cured.

In Examples 15-20 rubber strips and adhesion pads were constructed with several rubber compositions for a tire body ply. Three different elastomer blends were used in the rubber compositions. These blends were (1) poly(styrene-butadiene), polybutadiene, and natural rubber; (2) polybutadiene and natural rubber; and (3) poly(styrene-butadiene). Each of the rubber compositions also included carbon black, silica, wax, antioxidant, sulfur, oil, and accelerators. No significant variation in the refresh agent performance was observed across the different blends, so the testing results were combined and averaged together.

For the refresh agent, a foam/sponge brush was used to apply the refresh agent in a thin, uniform layer onto the face of the adhesion pad. It was observed that all of the refresh agents coated and wetted each of the rubber surfaces well. The adhesion pads were dried at room temperature for 5 minutes when no visible wetness was apparent. The application volume of refresh agent in each Example was approximately the same.

The uncured rubber strips were joined to the coated rubber on the adhesion pad. After 9 days of aging, the joined rubber strips of Examples 15-20 were tested by a standard procedure for 180° peel testing on an Instron 5565. These Examples were peel tested at a rate of 2 in/min and the gap distance was about 80 mm. Each refresh agent was tested a total of eight times and an average and a maximum force based on all eight tests is reported in Table 3. In each case the higher force indicates the stronger bond.

TABLE 3

| Refresh agent | Avg Force (N) | STD. DEV. | Max Force (N) | STD. DEV. |
| --- | --- | --- | --- | --- |
| Example 15 (toluene) control | 27.5 | 4.6 | 31.3 | 6.1 |
| Example 16 Orange Oil | 21.4 | 8.1 | 26.4 | 8.6 |
| Example 17 Limonene | 22.9 | 6.4 | 28.7 | 8.8 |
| Example 18 Pinene | 19.8 | 3.3 | 23.7 | 3.6 |
| Example 19 Pine Needle Oil | 28.5 | 10.7 | 34.7 | 14.9 |
| Example 20 Dodecane | 20.8 | 2.9 | 25.5 | 2.0 |

The results indicate that lower volatility refresh agents have comparable tack to toluene, and that such tack is sufficient for joining tire rubber components.

Examples 21-26

Examples 21-26 were performed to measure the cured peel strength of rubber components joined with the refresh agents of Examples 1-5 of Table 1 (Examples 22-26) in comparison to cured rubber components joined with one of the volatile organic solvents of Table 2, Example 8 (toluene) (Control Example 21). The cured peel strength measurement primarily shows the strength and durability of the bond of the cured rubber components.

In Examples 21-26, rubber strips and adhesion pads were constructed as they were in Examples 15-20, that is, with several rubber compositions for a tire body ply. Again, three different elastomer blends were used in the rubber compositions. These blends were (1) poly(styrene-butadiene), polybutadiene, and natural rubber; (2) polybutadiene and natural rubber; and (3) poly(styrene-butadiene). Each of the rubber compositions also included carbon black, silica, wax, antioxidant, sulfur, oil, and accelerators. No significant variation in the refresh agent performance was observed across the different blends so the testing results were combined and averaged together.

For the refresh agent, a foam/sponge brush was used to apply the refresh agent in a thin, uniform layer onto the face of the adhesion pad. It was observed that all of the refresh agents coated and wetted each of the rubber surfaces well. The adhesion pads were dried at room temperature for 5 minutes until no visible wetness was apparent. The application volume of refresh agent in each Example was approximately the same.

The uncured rubber strips were then joined to the coated, uncured rubber on the adhesion pad and the samples were cured at 170° C. for 15 minutes.

After 9 days of aging, the joined and cured rubber strips and adhesion pads of Examples 21-26 were tested by a standard procedure for 180° peel testing on an Instron 5565. These Examples were peel tested at a rate of 2 in/min and the gap distance was 30 mm.

Shown in Table 4 are the results for the 180° peel test for cured Examples 21-26. Each refresh agent was tested a total of eight times and an average and a maximum force based on all eight tests is reported in Table 4. In each case, the higher force indicates the stronger bond.

TABLE 4

| Cured Samples | Avg Force (N) | STD. DEV. | Max Force (N) | STD. DEV. |
| --- | --- | --- | --- | --- |
| Example 21 (toluene) control | 962.5 | 102.0 | 1326.6 | 104.0 |
| Example 22 Orange Oil | 840.3 | 121.0 | 1190.3 | 131.6 |
| Example 23 Limonene | 935.0 | 118.6 | 1297.4 | 95.0 |
| Example 24 Pinene | 899.6 | 161.4 | 1238.0 | 124.5 |
| Example 25 Pine Needle Oil | 883.4 | 29.6 | 1237.3 | 80.8 |
| Example 26 Dodecane | 795.5 | 223.9 | 1195.9 | 166.1 |

The results indicate that the lower volatility refresh agents of Examples 21-26 have comparable vulcanized bond strength to toluene, and that such bond strength is sufficient for joining vulcanized tire rubber components.

Examples 27 to 32

Additional stock adhesion test were performed on both uncured and cured stocks. These tests were performed according to the test conditions listed above for Examples 21-26 except the cure time and temperature of the cured Examples 30-32 is slightly different. The rubber stocks tested were natural rubber and also included carbon black, silica, wax, antioxidant, sulfur, oil, and accelerators. The results are reported in Table 5.

TABLE 5

| | Curing | Treatment | Avg Force (N) | Std Dev | Max Force (N) | Std Dev |
|---|---|---|---|---|---|---|
| Example 27 (control) | Uncured | Heptane | 104.3 | 11.3 | 161.0 | 43.9 |
| Example 28 | | Orange Oil | 109.8 | 1.9 | 146.9 | 3.4 |
| Example 29 | | C9-C15 cycloaliphatics and aliphatics* | 110.8 | 13.6 | 135.4 | 12.5 |
| Example 30 | Cured | Heptane | 888.4 | 52.7 | 1470.0 | 3.2 |
| Example 31 | (40 min at | Orange Oil | 634.5 | 322.6 | 1647.6 | 145.0 |
| Example 32 | 150° C.) | C9-C15 cycloaliphatics and aliphatics* | 502.6 | 168.1 | 1003.8 | 418.0 |

*Blend of 60-100% $C_9$-$C_{15}$ cycloaliphatics and 10-40% $C_9$-$C_{15}$ aliphatics The results indicate that the lower volatility refresh agents of Examples 28, 29, 31, and 32 have comparable vulcanized and unvulcanized bond strength to heptane, and that such bond strength is sufficient for joining vulcanized and unvulcanized tire rubber components.

Examples 33 to 35

In Example 33, a large tire (445/80R25) weighing approximately 330 lbs was constructed using dodecane as the refresh agent to hold the tire components together for vulcanizing. In Example 34 another large tire (445/80R25) weighing approximately 330 lbs was constructed using orange oil as the refresh agent to hold the tire components together for vulcanizing. In both examples the refresh agents were effective to hold the components together for curing. Furthermore, in each example the volume of orange oil and dodecane applied was reduced by approximately 63% compared to the volatile hexane/cyclohexane refresh agent used in prior mining tire constructions of the same size. No refresh agent was detected in the joined and cured tire components.

Durability testing of Examples 33 and 34 according to DOT Test FMVSS119 showed little or no variation (less than about 1%) in terms of mileage or time of use from a control example 35 that was made with a hexane/cyclohexane agent to provide tack for building the tire.

To the extent that the term "includes" or "including" is used in the specification or the claims, it is intended to be inclusive in a manner similar to the term "comprising" as that term is interpreted when employed as a transitional word in a claim. Furthermore, the use of the term "or" herein is the inclusive, and not the exclusive use, unless the context clearly indicates the contrary. Furthermore, the terms "a," "an," and "the" are used herein to mean one or more. The term "consist essentially of" is meant to also encompass "consists entirely of," and used in the customary manner to mean the listed ingredients and unlisted ingredients that do not materially affect the basic and novel properties of the methods, articles of manufacture, or compositions listed herein.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method comprising the steps of:
   applying an effective amount of a refresh agent to a surface of a first uncured rubber component, the refresh agent including a liquid selected from the group consisting of: one or more liquid terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, and combinations thereof, thereby forming a first coated surface; and
   joining a second uncured rubber component to the first coated surface of the first uncured rubber component at an interface;
   wherein the amount is effective to temporarily refresh tack of the first uncured rubber component and hold it to the second uncured rubber component until curing;
   curing the joined rubber components to form a vulcanized rubber article;
   prior to or during curing, the refresh agent evaporating or eluting from the joined rubber components;
   wherein the refresh agent has an evaporation rate of about 0.1 mg/min to about 8 mg/min at 25° C. and 1 atm pressure;
   wherein the vulcanized rubber article is free of or essentially free of the refresh agent.

2. The method of claim 1, wherein the refresh agent has a flash point of about 30° C. to about 100° C.

3. The method of claim 1, further comprising manufacturing the first uncured rubber component and the second uncured rubber component.

4. The method of claim 1, further comprising, prior to curing, the refresh agent evaporating or eluting from the joined rubber components.

5. The method of claim 1, wherein the refresh agent has a viscosity at 25° C. of about 0.0001 to about 100 cP.

6. The method of claim 1, wherein the refresh agent is selected from the group consisting of: orange oil, pinene, dodecane, limonene, and pine needle oil.

7. The method of claim 1, wherein the refresh agent consists essentially of a liquid selected from the group consisting of: one or more terpenes, limonene, carvone, pinene, pine needle oil, citral, orange oil, dodecane, decane, undecane, dipentene, 1,8-cineole, eucalyptol, citronellol, geraniol, citronellene, terpinen-4-ol, and combinations thereof.

8. A method for building a tire comprising the steps of: applying a coating to a surface of a first uncured rubber tire component, wherein the coating consists of a refresh agent selected from the group consisting of: carvone, pine needle oil, citral, orange oil, dodecane, decane, undecane, 1,8-cineole, eucalyptol, citronellol, geraniol, citronellene, and combinations thereof, thereby forming a first coated surface; and joining a second uncured rubber tire component to the first coated surface of the first uncured rubber tire component at an interface; wherein the refresh agent has a flash point of about 30° C. to about 100° C.

9. The method of claim 8, wherein the refresh agent has an evaporation rate of about 0.1 mg/min to about 8 mg/min at 25° C. and 1 atm pressure.

10. The method of claim 9, wherein the first uncured rubber tire component comprises an elastomer selected from the group consisting of: polychloroprene, butyl rubber, hevea and non-hevea natural rubber, polyisoprene, polybutadiene, nitrile rubber, poly(isoprene-styrene), poly(isoprene-butadiene), poly(styrene-butadiene), terpolymers of isoprene, styrene, and butadiene, and combinations thereof; and a reinforcing filler.

11. The method of claim 10, wherein the first uncured rubber tire component is a sidewall or a carcass layer, and the second uncured rubber tire component is a tread.

12. The method of claim 10, wherein the reinforcing filler is present in an amount of about 50 to about 100 phr.

13. The method of claim 10, wherein the first uncured rubber tire component comprises a wax.

14. The method of claim 8, wherein the refresh agent is selected from the group consisting of: carvone, citral, orange oil, dodecane, decane, undecane, 1,8-cineole, eucalyptol, citronellol, geraniol, citronellene, and combinations thereof.

15. The method of claim 8, wherein an amount of the coating applied to the surface of the first uncured rubber tire component is effective to temporarily refresh tack of the first uncured rubber component and hold it to the second uncured rubber component until curing.

16. A method for building a tire comprising the steps of: applying a refresh agent to a surface of a first uncured rubber tire component, wherein the refresh agent includes limonene thereby forming a first coated surface; and joining a second uncured rubber tire component to the first coated surface of the first uncured rubber tire component at an interface or joining the first coated surface to an overlapping or butt-end portion of the first uncured rubber tire component; wherein the refresh agent has an evaporation rate of about 0.1 mg/min to about 8 mg/min at 25° C. and 1 atm pressure; wherein an amount of the refresh agent applied to the surface of the first uncured rubber tire component is effective to temporarily refresh tack of the first uncured rubber component and hold it to the second uncured rubber component until curing; curing the joined rubber tire components to form a vulcanized rubber tire article; prior to or during curing, the refresh agent evaporating or eluting from the joined rubber tire components; wherein the vulcanized rubber tire article is free of or essentially free of the refresh agent.

17. The method of claim 16, comprising joining the first coated surface to the overlapping or butt-end portion of the first uncured rubber tire component at the interface.

18. The method of claim 16, wherein the refresh agent further comprises an agent selected from the group consisting of: orange oil, dodecane, and pine needle oil and combinations thereof.

19. The method of claim 16, wherein the refresh agent consists essentially of limonene.

20. The method of claim 16, wherein the first uncured rubber tire component includes a rubber polymer with a polydispersity (Mw/Mn) of about 1.5 to about 6.0.

* * * * *